United States Patent
Tsai

(10) Patent No.: US 7,651,610 B2
(45) Date of Patent: Jan. 26, 2010

(54) WATER AERATING AND DIRT COLLECTING ASSEMBLY FOR AQUARIUM

(76) Inventor: Hsueh Lee Tsai, 1F, No. 55, Jenyi Road, Huwei Town, Yunlin Hsien 63244 (TW)

( * ) Notice: Subject to any disclaimer, the term of this patent is extended or adjusted under 35 U.S.C. 154(b) by 156 days.

(21) Appl. No.: 11/985,446

(22) Filed: Nov. 14, 2007

(65) Prior Publication Data

US 2009/0120859 A1    May 14, 2009

(51) Int. Cl.
*A01K 63/04* (2006.01)
*C02F 1/40* (2006.01)

(52) U.S. Cl. .................. 210/167.26; 210/167.27; 210/221.1; 210/221.2; 210/416.2; 210/905

(58) Field of Classification Search ........... 210/167.21, 210/167.26, 167.27, 416.1, 416.2, 905, 221.1, 210/221.2; 119/261
See application file for complete search history.

(56) References Cited

U.S. PATENT DOCUMENTS 6,303,028 B1 * 10/2001 Marks et al. ........... 210/167.27
6,857,392 B1    2/2005  Shyu .................. 119/263
6,912,972 B1 *  7/2005  Tsai .................. 119/263
7,011,748 B2    3/2006  Tsai .................. 210/169
7,445,706 B2 * 11/2008  Liu ................... 210/167.21

FOREIGN PATENT DOCUMENTS

JP    2000-202431 A  *  7/2000
JP    2002-331285 A  * 11/2002

* cited by examiner

*Primary Examiner*—Fred Prince
(74) *Attorney, Agent, or Firm*—Charles E. Baxley

(57) ABSTRACT

A water aerating and dirt collecting device for an aquarium includes a pumping device having a paddle device for pumping and circulating the water contained within the aquarium, a receptacle having an entrance coupled to the pumping device for receiving the water from the pumping device and for agitating the water and for generating an eddy current, and a casing having an inlet port coupled to the receptacle for receiving a filtered dirt from the receptacle and having a mouth coupled to the pumping device for allowing an air in the casing to be drawn into the pumping device. The receptacle includes a tubular member for collecting the filtered dirt.

12 Claims, 4 Drawing Sheets

WATER AERATING AND DIRT COLLECTING ASSEMBLY FOR AQUARIUM

BACKGROUND OF THE INVENTION

1. Field of the Invention

The present invention relates to a water aerating and dirt collecting assembly for an aquarium, and more particularly to a water aerating and dirt collecting assembly for attaching to an aquarium and for suitably agitating the water and the carbon dioxide and for suitably supplying the carbon dioxide into the water contained within the container and for suitably filtering and collecting the dirt contained within the water of the container.

2. Description of the Prior Art

Typical aquarium facilities comprise a pump disposed in a chamber of a container for circulating the water contained within the container and for pumping fresh air or carbon dioxide into the container and thus for airing or aerating purposes.

For example, U.S. Pat. No. 6,857,392 to Shyu discloses one of the typical aquarium pumping and airing apparatuses comprising a pump including a paddle device coupled to a rotor for being operated to pump and to circulate the water contained within the container.

However, the typical aquarium pumping and airing apparatus has no water aerating and dirt collecting assemblies for suitably separating and collecting the dirt contained within the container and the dirt may remain or may still be contained within the container and may not be removed from the container.

U.S. Pat. No. 7,011,748 to Tsai discloses another typical aerating and dirt collecting assembly for an aquarium and also comprising a paddle wheel for agitating the water and/or the air and for pumping the air and/or the carbon dioxide into the water of the container and for generating bubbles to collect the dirt or the protein or the like contained in the bubbles.

However, the carbon dioxide may not be suitably agitated and may not be suitably supplied into the water contained within the container.

The present invention has arisen to mitigate and/or obviate the afore-described disadvantages of the conventional water aerating and dirt collecting assemblies for aquarium facilities.

SUMMARY OF THE INVENTION

The primary objective of the present invention is to provide a water aerating and dirt collecting assembly for attaching to an aquarium and for suitably agitating the water and the carbon dioxide and for suitably supplying the carbon dioxide into the water contained within the container and for suitably filtering and collecting the dirt contained within the water of the container.

In accordance with one aspect of the invention, there is provided a water aerating and dirt collecting assembly for an aquarium comprising a pumping device for attaching a container of the aquarium, and including a water inlet and a water outlet, and a paddle device for pumping a water in the container into the water inlet and out of the water outlet and for circulating the water contained within the container, a receptacle including an entrance coupled to the water outlet of the pumping device for receiving the water from the pumping device, and including an exit, and a casing including an inlet port provided in an upper portion of the casing and coupled to the exit of the receptacle with a pipe for receiving a dirt from the receptacle, and including a mouth provided in the upper portion of the casing and coupled to the water inlet of the pumping device with a hose for allowing an air in the casing to be drawn into the pumping device.

The receptacle includes at least one protrusion extended therein for agitating the water flowing into the receptacle and for generating an eddy current. The receptacle includes a tube extended therein and the protrusion is extended from the tube.

The receptacle includes at least one opening formed therein for allowing the water to flow into the container, and a filter member disposed in the receptacle and aligned with the opening of the receptacle for filtering the water. The receptacle may include at least two housing members coupled together.

The receptacle includes a cap openably attached on top to selectively close the receptacle. The cap includes at least one opening formed therein for allowing an air to flow into the receptacle.

The receptacle includes a tubular member extended in an upper portion thereof for forming an annular chamber in the receptacle and for collecting the dirt in the annular chamber of the receptacle. The casing may include at least two casing members coupled together.

The casing includes a cover openably attached on top to selectively close the casing. The inlet port of the casing and/or the mouth may be provided on the cover.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
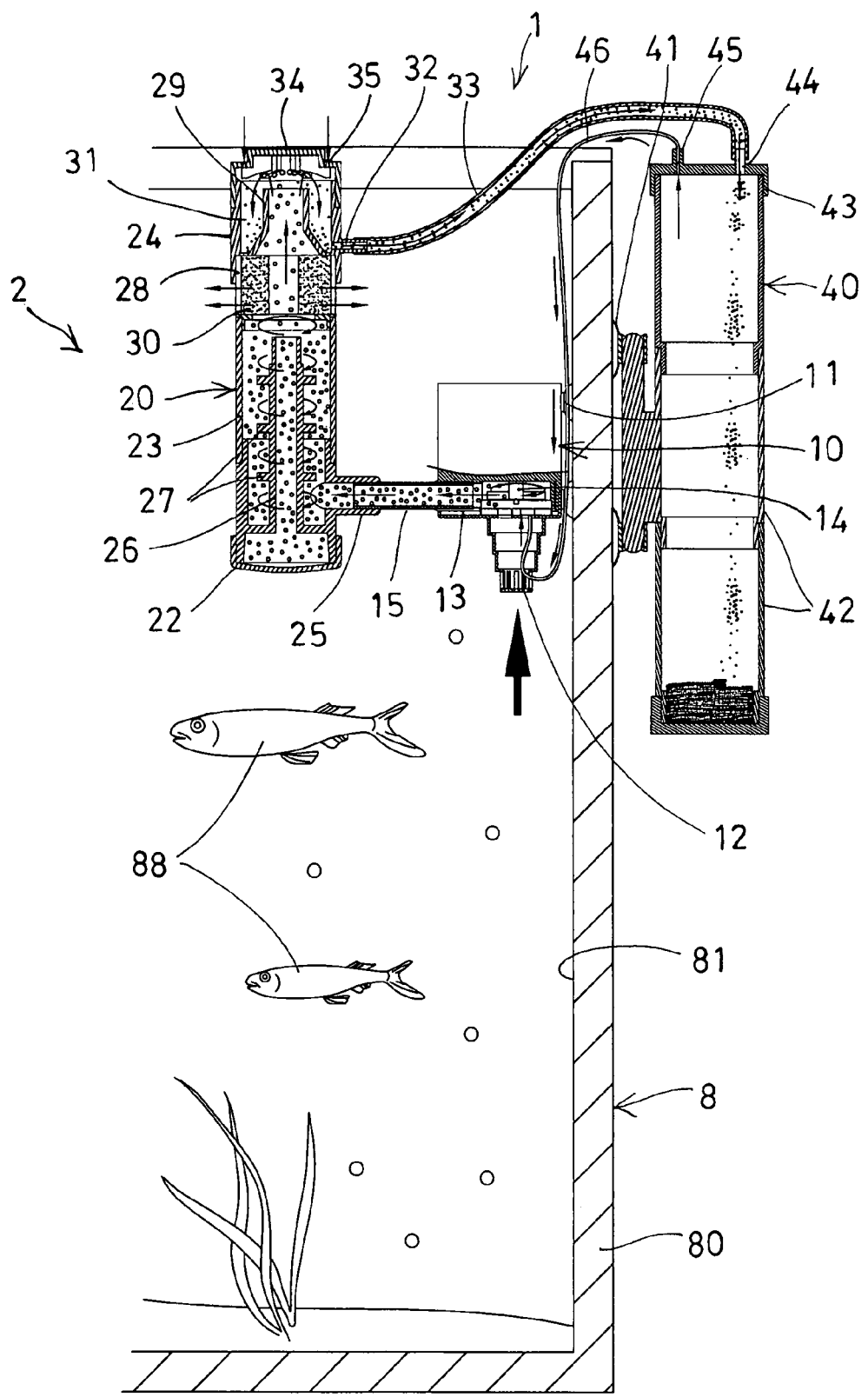
FIG. 1 is a cross sectional view illustrating the operation of a water aerating and dirt collecting assembly in accordance with the present invention.
Figure 2:
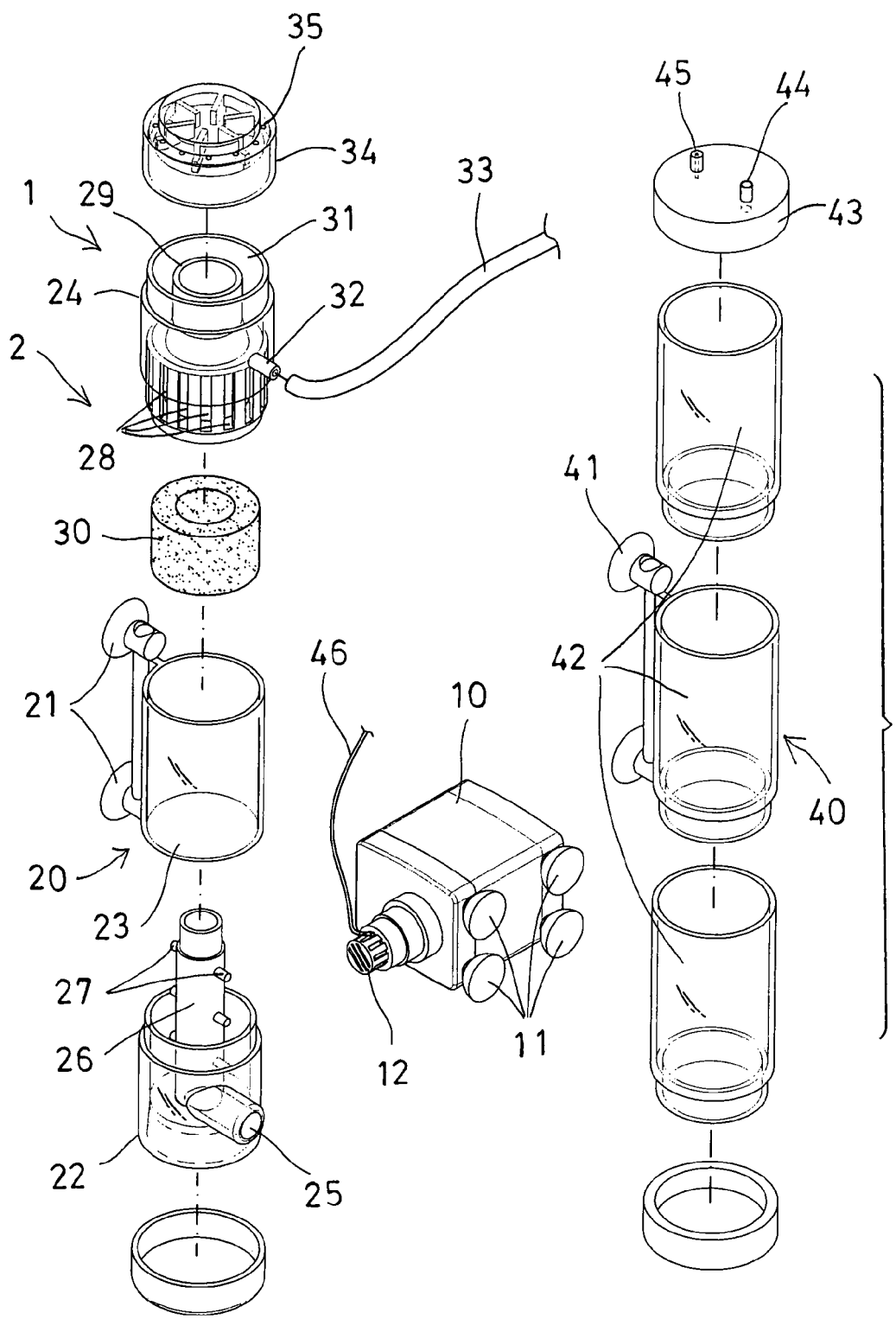
FIG. 2 is an exploded view of the water aerating and dirt collecting assembly.
Figure 3:
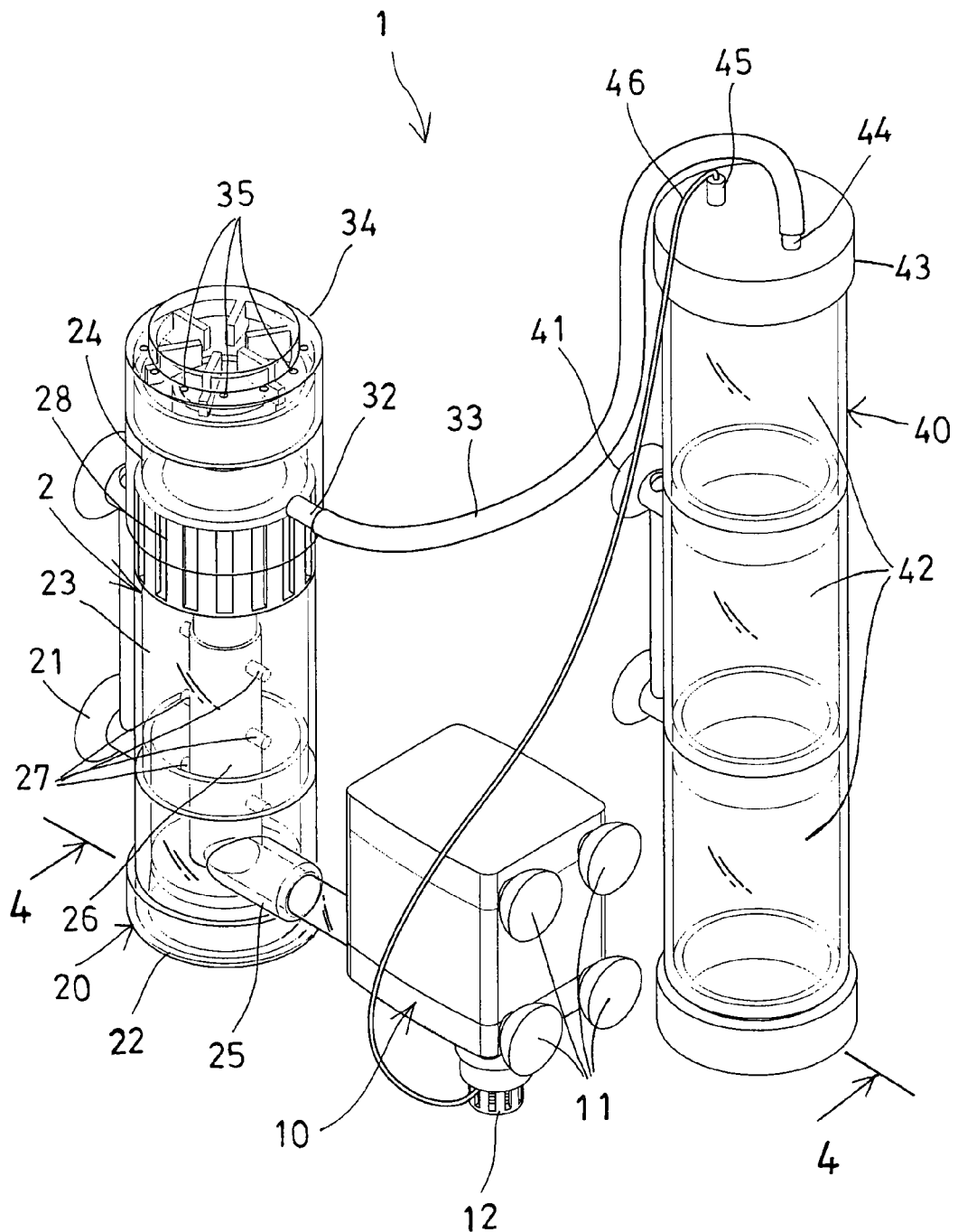
FIG. 3 is a perspective view of the water aerating and dirt collecting assembly.
Figure 4:
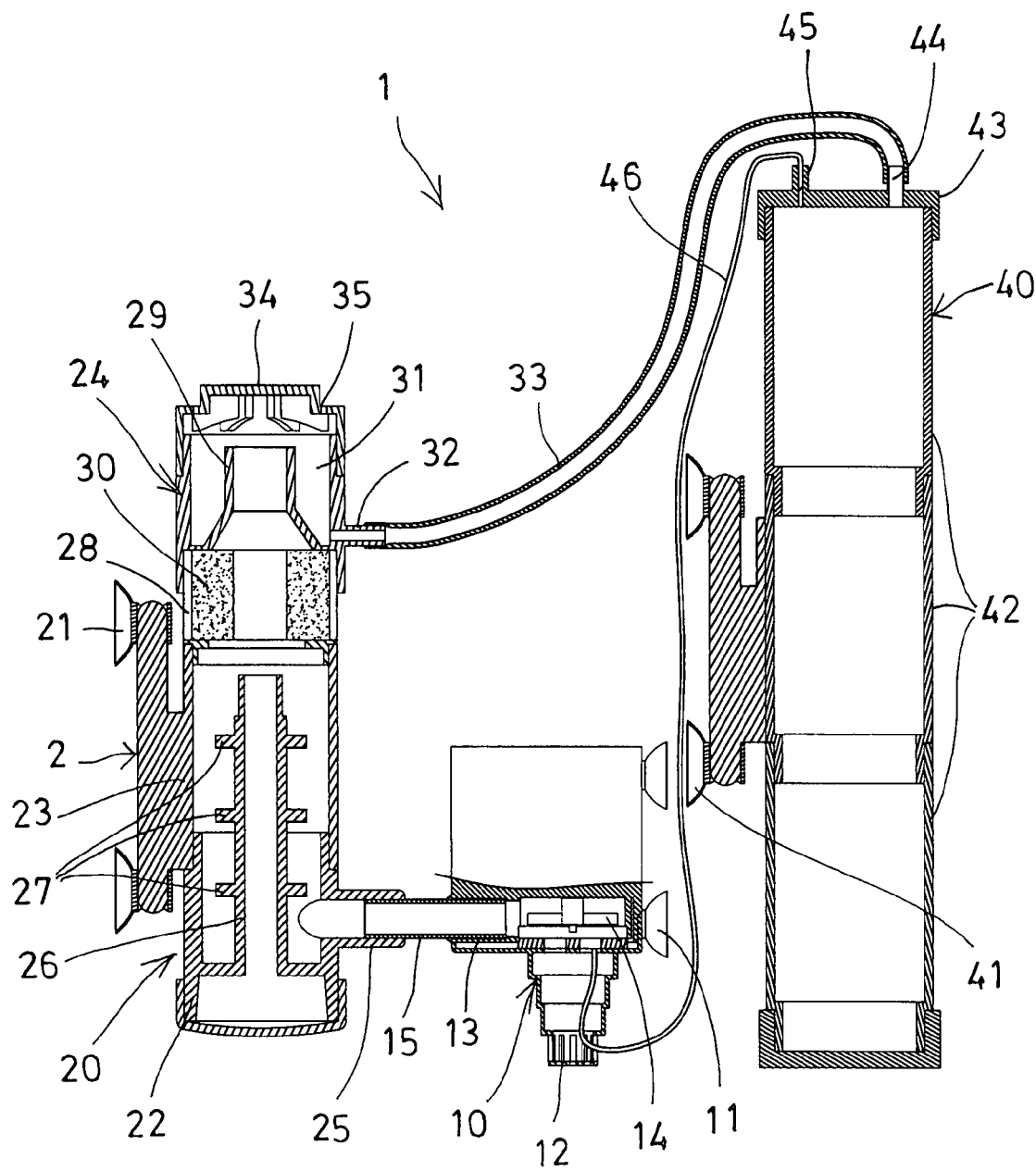
FIG. 4 is a cross sectional view of the water aerating and dirt collecting assembly taken along lines 4-4 of FIG. 3.

Referring to the drawings, and initially to FIGS. 1-3, a water aerating and dirt collecting assembly 1 in accordance with the present invention is provided for attaching to an aquarium 8 which comprises a container 80 including a chamber 81 formed therein for receiving water and fish 88, and comprises a pumping device 10 for attaching to the interior of the container 80 with hooks or latches or fasteners (not shown) or sucking cups 11 or the like, the pumping device 10 includes a water inlet 12 formed or provided in such as the lower portion thereof, and includes a water outlet 13 formed or provided in such as the middle portion thereof, and includes a motorized paddle wheel or paddle device 14 for pumping the water from the container 80 into the water inlet 12 and out of the water outlet 13 and for circulating the water contained within the container 80.

The water aerating and dirt collecting assembly 1 further includes a protein separating device 2 having a receptacle 20 for attaching to the interior of the container 80 with hooks or latches or fasteners (not shown) or sucking cups 21 or the like, the receptacle 20 may include one or more (such as three) housing members 22, 23, 24 assembled or secured or coupled together with such as force-fitted engagements, hooks or latches or fasteners (not shown) or with adhesive materials, or by welding processes, and may include an entrance 25 formed or provided in such as the lower portion thereof or the lower housing member 22 and coupled to the water outlet 13 of the pumping device 10 with a tubular coupling member 15 for receiving the water pumped by the pumping device 10.

The receptacle 20 may include a tube 26, such as a hollow tube 26 extended therein and one or more protrusions 27 extended outwardly from the tube 26 for agitating the water and for forming or generating an eddy current (FIG. 1), and thus for suitably separating the dirt or the protein contained within the water and/or for suitably agitating the water and the carbon dioxide and/or the air contained within the water and for allowing the carbon dioxide and/or the air to be suitably agitated or minimized into a large amount of smaller air bubbles. The receptacle 20 includes one or more openings 28 formed in such as the upper portion thereof or the upper housing member 24 for allowing the water to flow into the chamber 81 of the container 80.

A filter sponge or member 30 may be disposed in the upper housing member 24 and aligned with the openings 28 of the upper housing member 24 or of the receptacle 20 for filtering the water and for separating the dirt or the protein from the water and thus for preventing the filtered dirt or protein from flowing into the chamber 81 of the container 80 again. It is preferable that the receptacle 20 includes a tubular member 29 extended in such as the upper portion thereof or the upper housing member 24 for forming an annular chamber 31 between the tubular member 29 and the upper housing member 24, and after the eddy current flowing upwardly through the interior or the inner portion of the tubular member 29, the dirt or the protein may be moved over the tubular member 29 and may have a good chance to be collected in the lower portion of the annular chamber 31 of the upper housing member 24.

The receptacle 20 may further include an exit 32 formed or provided in such as the upper portion thereof or the upper housing member 23 and preferably communicating with the lower portion of the annular chamber 31 for allowing the dirt or the protein collected in the lower portion of the annular chamber 31 of the upper housing member 24 to flow out through the exit 32 and to flow into a pipe 33. The receptacle 20 may further include a cap 34 openably attached on top thereof to selectively enclose the upper housing member 24 of the receptacle 20, and the cap 34 may include one or more orifices 35 formed therein for allowing the air to flow into the receptacle 20 and to be mixed or blended or supplied into the water and to selectively flow out through the exit 32 and to flow into the pipe 33.

The water aerating and dirt collecting assembly 1 further includes a casing 40 for attaching to the interior of the container 80 with hooks or latches or fasteners (not shown) or sucking cups 41 or the like, the casing 40 may include one or more (such as three) housing members 42 assembled or secured together with such as force-fitted engagements, hooks or latches or fasteners (not shown) or with adhesive materials, or by welding processes, and may include a cover 43 openably attached on top of the casing 40 to selectively enclose the casing 40, and may include an inlet port 44 formed or provided in such as the upper portion of the casing 40 or formed in the cover 43, and coupled to the pipe 33 for allowing the dirt or the protein collected in the lower portion of the annular chamber 31 of the upper housing member 24 to flow through the pipe 33 and to flow into the casing 40 and thus to be collected in the casing 40.

The casing 40 may further include a mouth 45 formed or provided in such as the upper portion of the casing 40 or formed in the cover 43, and coupled to the water inlet 12 of the pumping device 10 with a hose 46 for allowing the air contained in the upper portion of the casing 40 to be vacuumed or pumped or sucked or drawn into the pumping device 10 with or by the motorized paddle wheel or paddle device 14. When the air contained in the upper portion of the casing 40 is vacuumed or pumped or sucked or drawn into the pumping device 10, the casing 40 may be selectively vacuumed, or the dirt or the protein collected in the lower portion of the annular chamber 31 of the upper housing member 24 may be suitably drawn to flow through the pipe 33 and to flow into the casing 40 and thus to be collected in the casing 40.

It is to be noted that the filtered dirt or protein may be filtered and separated from the water by the filter sponge or member 30, and the filtered water may flow into the chamber 81 of the container 80 to prevent the filtered dirt or protein from flowing into the chamber 81 of the container 80 again. The fresh air may flow through the orifices 35 and may flow into the receptacle 20 and may be drawn to flow through the pipe 33 and to flow into the casing 40 and then to flow through the hose 46 and to flow into the pumping device 10 and thus for allowing the fresh air to be suitably supplied into the water contained within the container 80. It is preferable that the tubular member 29 of the receptacle 20 is arranged to allow only the filtered dirt or protein to move over the tubular member 29 and to be collected in the lower portion of the annular chamber 31 of the upper housing member 24.

Accordingly, the water aerating and dirt collecting assembly in accordance with the present invention may be provided for attaching to an aquarium and for suitably agitating the water and the carbon dioxide and for suitably supplying the carbon dioxide into the water contained within the container and for suitably filtering and collecting the dirt contained within the water of the container.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A water aerating and dirt collecting assembly for an aquarium comprising:

a pumping device for attaching a container of the aquarium, and including a water inlet and a water outlet, and a paddle device for pumping a water in the container into said water inlet and out of said water outlet and for circulating the water contained within the container, a receptacle including an entrance coupled to said water outlet of said pumping device for receiving the water from said pumping device, and including an exit, and a casing including an inlet port provided in an upper portion of said casing and coupled to said exit of said receptacle with a pipe for receiving a dirt from said receptacle, and including a mouth provided in the upper portion of said casing and coupled to said water inlet of said pumping device with a hose for allowing an air in said casing to be drawn into said pumping device.

2. The water aerating and dirt collecting assembly as claimed in claim 1, wherein said receptacle includes at least one protrusion extended therein for agitating the water flowing into said receptacle and for generating an eddy current.

3. The water aerating and dirt collecting assembly as claimed in claim 2, wherein said receptacle includes a tube extended therein and said at least one protrusion is extended from said tube.

4. The water aerating and dirt collecting assembly as claimed in claim 1, wherein said receptacle includes at least one opening formed therein for allowing the water to flow into the container, and a filter member disposed in said receptacle and aligned with said at least one opening of said receptacle for filtering the water.

5. The water aerating and dirt collecting assembly as claimed in claim 1, wherein said receptacle includes at least two housing members coupled together.

6. The water aerating and dirt collecting assembly as claimed in claim 1, wherein said receptacle includes a cap openably attached on top to selectively close said receptacle.

7. The water aerating and dirt collecting assembly as claimed in claim 6, wherein said cap includes at least one opening formed therein for allowing an air to flow into said receptacle.

8. The water aerating and dirt collecting assembly as claimed in claim 1, wherein said receptacle includes a tubular member extended in an upper portion thereof for forming an annular chamber in said receptacle and for collecting the dirt in said annular chamber of said receptacle.

9. The water aerating and dirt collecting assembly as claimed in claim 1, wherein said casing includes at least two casing members coupled together.

10. The water aerating and dirt collecting assembly as claimed in claim 1, wherein said casing includes a cover openably attached on top to selectively close said casing.

11. The water aerating and dirt collecting assembly as claimed in claim 10, wherein said inlet port of said casing is provided on said cover.

12. The water aerating and dirt collecting assembly as claimed in claim 10, wherein said mouth is provided on said cover.

* * * * *